US008917738B2

(12) United States Patent
Sundararaman et al.

(10) Patent No.: US 8,917,738 B2
(45) Date of Patent: Dec. 23, 2014

(54) MULTICASTING TRAFFIC MANAGER IN A NETWORK COMMUNICATIONS PROCESSOR ARCHITECTURE

(75) Inventors: Balakrishnan Sundararaman, Cedar Park, TX (US); Shailendra Aulakh, Austin, TX (US); David P. Sonnier, Austin, TX (US); Rachel Flood, Austin, TX (US)

(73) Assignee: LSI Corporation, Milpitas, CA (US)

( * ) Notice: Subject to any disclaimer, the term of this patent is extended or adjusted under 35 U.S.C. 154(b) by 611 days.

(21) Appl. No.: 13/232,422

(22) Filed: Sep. 14, 2011

(65) Prior Publication Data

US 2012/0002546 A1    Jan. 5, 2012

Related U.S. Application Data

(63) Continuation-in-part of application No. 12/782,379, filed on May 18, 2010, which is a continuation-in-part of application No. 12/782,393, filed on May 18, 2010, now Pat. No. 8,255,644, which is a continuation-in-part of application No. 12/782,411, filed on May 18, 2010, now Pat. No. 8,407,707.

(60) Provisional application No. 61/388,962, filed on Oct. 1, 2010.

(51) Int. Cl.
*H04L 12/28* (2006.01)
*H04L 12/931* (2013.01)
*H04L 12/933* (2013.01)

(52) U.S. Cl.
CPC ............. *H04L 49/506* (2013.01); *H04L 49/00* (2013.01); *H04L 49/101* (2013.01); *H04L 49/109* (2013.01); *H04L 49/201* (2013.01)
USPC ...................................... 370/412; 370/395.71

(58) Field of Classification Search
CPC ... H04W 40/00; H04W 40/24; H04W 40/246; H04W 28/00; H04W 28/02; H04W 28/0226; H04W 28/0231; H04Q 11/00–11/0071; H04Q 2011/00–2011/003
USPC ................. 370/229, 235, 236, 395.4, 395.42, 370/395.71, 412–419, 429
See application file for complete search history.

(56) References Cited

U.S. PATENT DOCUMENTS 4,622,631 A    11/1986    Frank et al.
5,623,698 A    4/1997    Stephenson et al.
(Continued)

FOREIGN PATENT DOCUMENTS

JP    H02-271444    11/1990

*Primary Examiner* — Michael Thier
*Assistant Examiner* — Prince A Mensah
(74) *Attorney, Agent, or Firm* — Daniel J. Santos; Smith Risley Tempel Santos LLC

(57) ABSTRACT

Described embodiments provide a method of processing packets of a network processor. One or more tasks are generated corresponding to received packets associated with one or more data flows. A traffic manager receives a task corresponding to a data flow, the task provided by a processing module of the network processor. The traffic manager determines whether the received task corresponds to a unicast data flow or a multicast data flow. If the received task corresponds to a multicast data flow, the traffic manager determines, based on identifiers corresponding to the task, an address of launch data stored in launch data tables in a shared memory, and reads the launch data. Based on the identifiers and the read launch data, two or more output tasks are generated corresponding to the multicast data flow, and the two or more output tasks are added at the tail end of a scheduling queue.

20 Claims, 11 Drawing Sheets

(56) References Cited

U.S. PATENT DOCUMENTS

| | | | |
|---|---|---|---|
| 5,892,766 A | 4/1999 | Wicki et al. | |
| 5,943,283 A | 8/1999 | Wong et al. | |
| 6,038,630 A | 3/2000 | Foster et al. | |
| 6,195,335 B1 | 2/2001 | Calvignac et al. | |
| 6,216,167 B1 | 4/2001 | Momirov | |
| 6,289,013 B1 | 9/2001 | Lakshman et al. | |
| 6,341,130 B1 | 1/2002 | Lakshman et al. | |
| 6,567,564 B1 | 5/2003 | van der Wal | |
| 6,636,932 B1 | 10/2003 | Regev et al. | |
| 6,977,930 B1 * | 12/2005 | Epps et al. | 370/392 |
| 7,089,346 B2 | 8/2006 | Cebulla et al. | |
| 7,103,045 B2 * | 9/2006 | Lavigne et al. | 370/392 |
| 7,110,415 B1 * | 9/2006 | Walsh et al. | 370/414 |
| 7,234,018 B1 | 6/2007 | Purcell et al. | |
| 7,397,809 B2 | 7/2008 | Wang | |
| 7,461,208 B1 | 12/2008 | Caprioli et al. | |
| 7,519,065 B2 | 4/2009 | Angle et al. | |
| 7,596,142 B1 | 9/2009 | MacAdam | |
| 7,720,055 B2 | 5/2010 | Kadambi et al. | |
| 2002/0012327 A1 * | 1/2002 | Okada | 370/328 |
| 2002/0029214 A1 | 3/2002 | Yianilos et al. | |
| 2002/0034182 A1 * | 3/2002 | Mallory | 370/394 |
| 2002/0165985 A1 | 11/2002 | Chen et al. | |
| 2003/0033276 A1 | 2/2003 | Cheng et al. | |
| 2003/0115417 A1 | 6/2003 | Corrigan | |
| 2003/0123468 A1 | 7/2003 | Nong | |
| 2003/0174701 A1 * | 9/2003 | Angle et al. | 370/390 |
| 2004/0255209 A1 | 12/2004 | Gross | |
| 2005/0027920 A1 | 2/2005 | Fitzsimmons et al. | |
| 2005/0152352 A1 | 7/2005 | Jun et al. | |
| 2006/0256783 A1 | 11/2006 | Ayrapetian et al. | |
| 2006/0259572 A1 * | 11/2006 | Brown | 709/213 |
| 2007/0016756 A1 | 1/2007 | Hsieh et al. | |
| 2007/0226798 A1 | 9/2007 | Sibert | |
| 2008/0162793 A1 | 7/2008 | Chu et al. | |
| 2010/0157931 A1 * | 6/2010 | Vanderaar et al. | 370/329 |
| 2010/0260198 A1 | 10/2010 | Rojas-Cessa et al. | |

* cited by examiner

MULTICASTING TRAFFIC MANAGER IN A NETWORK COMMUNICATIONS PROCESSOR ARCHITECTURE

CROSS-REFERENCE TO RELATED APPLICATIONS

This application claims the benefit of the filing date of U.S. provisional application No. 61/388,962, filed Oct. 1, 2010, the teachings of which are incorporated herein in their entireties by reference.

This application is a continuation-in-part, and claims the benefit of the filing date, of U.S. patent application Ser. No. 12/782,379 filed May 18, 2010, Ser. No. 12/782,393 now U.S. Pat. No. 8,255,644 filed May 18, 2010, and Ser. No. 12/782,411 now U.S. Pat. No. 8,407,707 filed May 18, 2010, the teachings of which are incorporated herein in their entireties by reference.

The subject matter of this application is related to U.S. patent application Ser. No. 12/430,438 filed Apr. 27, 2009, Ser. No. 12/729,226 filed Mar. 22, 2010, Ser. No. 12/729,231 filed Mar. 22, 2010, Ser. No. 12/963,895 filed Dec. 9, 2010, Ser. No. 12/971,742 filed Dec. 17, 2010, Ser. No. 12/974,477 filed Dec. 21, 2010, Ser. No. 12/975,823 filed Dec. 22, 2010, Ser. No. 12/975,880 filed Dec. 22, 2010, Ser. No. 12/976,045 filed Dec. 22, 2010, Ser. No. 12/976,228 filed Dec. 22, 2010, Ser. No. 12/979,551 filed Dec. 28, 2010, Ser. No. 12/979,665 filed Dec. 28, 2010, Ser. No. 12/979,800 filed Dec. 28, 2010, Ser. No. 13/046,717 filed Mar. 12, 2011, Ser. No. 13/046,719 filed Mar. 12, 2011, Ser. No. 13/046,726 filed Mar. 12, 2011, Ser. No. 13/192,104 filed Jul. 27, 2011, Ser. No. 13/192,140 filed Jul. 27, 2011, and Ser. No. 13/192,187 filed Jul. 27, 2011, the teachings of which are incorporated herein in their entireties by reference.

BACKGROUND OF THE INVENTION

1. Field of the Invention

The present invention relates to communication systems, in particular, to data caching and coherency maintenance for an accelerated processor architecture for packet networks.

2. Description of the Related Art

Network processors are generally used for analyzing and processing packet data for routing and switching packets in a variety of applications, such as network surveillance, video transmission, protocol conversion, voice processing, and internet traffic routing. Early types of network processors were based on software-based approaches with general-purpose processors, either singly or in a multi-core implementation, but such software-based approaches are slow. Further, increasing the number of general-purpose processors diminished performance improvements, or actually slowed down overall network processor throughput. Newer designs add hardware accelerators to offload certain tasks from the general-purpose processors, such as encryption/decryption, packet data inspections, and the like. These newer network processor designs are traditionally implemented with either i) a non-pipelined architecture or ii) a fixed-pipeline architecture.

In a typical non-pipelined architecture, general-purpose processors are responsible for each action taken by acceleration functions. A non-pipelined architecture provides great flexibility in that the general-purpose processors can make decisions on a dynamic, packet-by-packet basis, thus providing data packets only to the accelerators or other processors that are required to process each packet. However, significant software overhead is involved in those cases where multiple accelerator actions might occur in sequence.

In a typical fixed-pipeline architecture, packet data flows through the general-purpose processors and/or accelerators in a fixed sequence regardless of whether a particular processor or accelerator is required to process a given packet. This fixed sequence might add significant overhead to packet processing and has limited flexibility to handle new protocols, limiting the advantage provided by using the accelerators. Network processors implemented as a system on chip (SoC) having multiple processing modules might typically classify an incoming packet to determine which of the processing modules will perform operations for the particular packet or flow of packets.

A network processor in a switching network might provide transport of received data packets from an input port to one (unicast) or more (multicast) output ports of the network. Received data packets are provided to one or more output ports according to a scheduling algorithm. Some network switches provide multicasting by replicating received packets at the output port(s) corresponding to the received packet. Multicast packets might be replicated as many times as the number of output ports to which the multicast packet is to be broadcast. Thus, in some network switches, large amounts of packet data are replicated to enable multicasting.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a method of processing packets of a network processor having a plurality of processing modules and a shared memory with packet data. The network processor generates one or more tasks corresponding to each of a plurality of received packets associated with one or more data flows. A traffic manager of the network processor receives a task corresponding to a data flow, the task provided by a processing module of the network processor. The traffic manager determines whether the received task corresponds to a unicast data flow or a multicast data flow, wherein a unicast data flow is transmitted to a single network location in communication with the network processor, and a multicast data flow is transmitted to one or more network locations in communication with the network processor. If the received task corresponds to a multicast data flow, an address in the shared memory of launch data tables is determined based on one or more identifiers corresponding to the task. The launch data corresponding to the task is read from the determined address. Two or more output tasks corresponding to the multicast data flow are generated based on the one or more identifiers and the read launch data. If at least one scheduling queue of the traffic manager corresponding to the multicast data flow is available to receive the two or more output tasks, the one or more output tasks are added at the tail end of the at least one scheduling queue.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

mapping table. The multicast group structure defines the number and flow of the multicast task copies.

Table 1 defines a list of acronyms employed throughout this specification as an aid to understanding the described embodiments of the present invention:

TABLE 1

| USB | Universal Serial Bus | FIFO | First-In, First-Out |
|---|---|---|---|
| SATA | Serial Advanced Technology Attachment | I/O | Input/Output |
| | | DDR | Double Data Rate |
| SCSI | Small Computer System Interface | DRAM | Dynamic Random Access Memory |
| SAS | Serial Attached SCSI | | |
| PCI-E | Peripheral Component Interconnect Express | MMB | Memory Manager Block |
| | | CPU | Central Processing Unit |
| SRIO | Serial RapidIO | µP | Microprocessor |
| SoC | System-on-Chip | PLB | Processor Local Bus |
| AXI | Advanced eXtensible Interface | MPP | Modular Packet Processor |
| AMBA | Advanced Microcontroller Bus Architecture | AAL5 | ATM Adaptation Layer 5 |
| | | SED | Stream Editor |
| PAB | Packet Assembly Block | THID | Thread Identifier |
| MTM | Modular Traffic Manager | PQM | Pre-Queue Modifier |
| DBC | Data Buffer Controller | FBI | Function Bus Interface |
| HE | Hash Engine | CCL | Classification Completion List |
| SENG | State Engine | SEM | Semaphore Engine |
| TID | Task Identifier | PCM | Per Context Memory |
| SCH | Scheduler | PDU | Protocol Data Unit |
| SPP | Security Protocol Processor | PIC | Packet Integrity Checker |
| TIL | Task Input Logic | FSM | Finite State Machine |
| TCP | Transmission Control Protocol | MCR | Minimum Cell Rate |
| TS | Traffic Shaper | AF | Assured Forwarding |
| PCR | Peak Cell Rate | SDWRR | Smooth Deficit Weighed Round Robin |
| EF | Expedited Forwarding | | |
| BE | Best Effort Forwarding | CRC | Cyclic Redundancy Check |
| IP | Internet Protocol | | |

Figure 3:
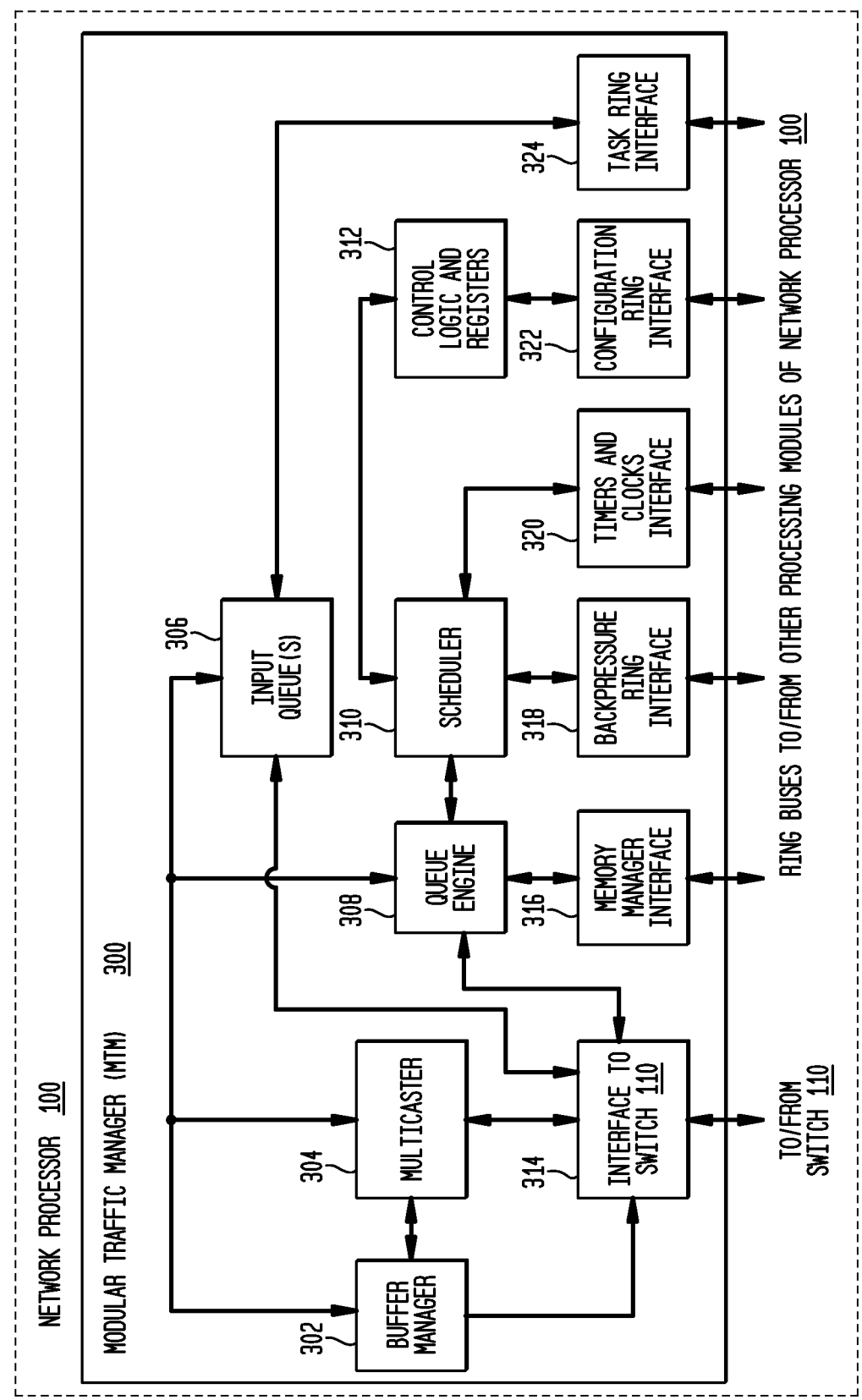
FIG. 3 shows a block diagram of a traffic manager of the network processor of FIG. 1, in accordance with embodiments of the present invention.
Figure 4:
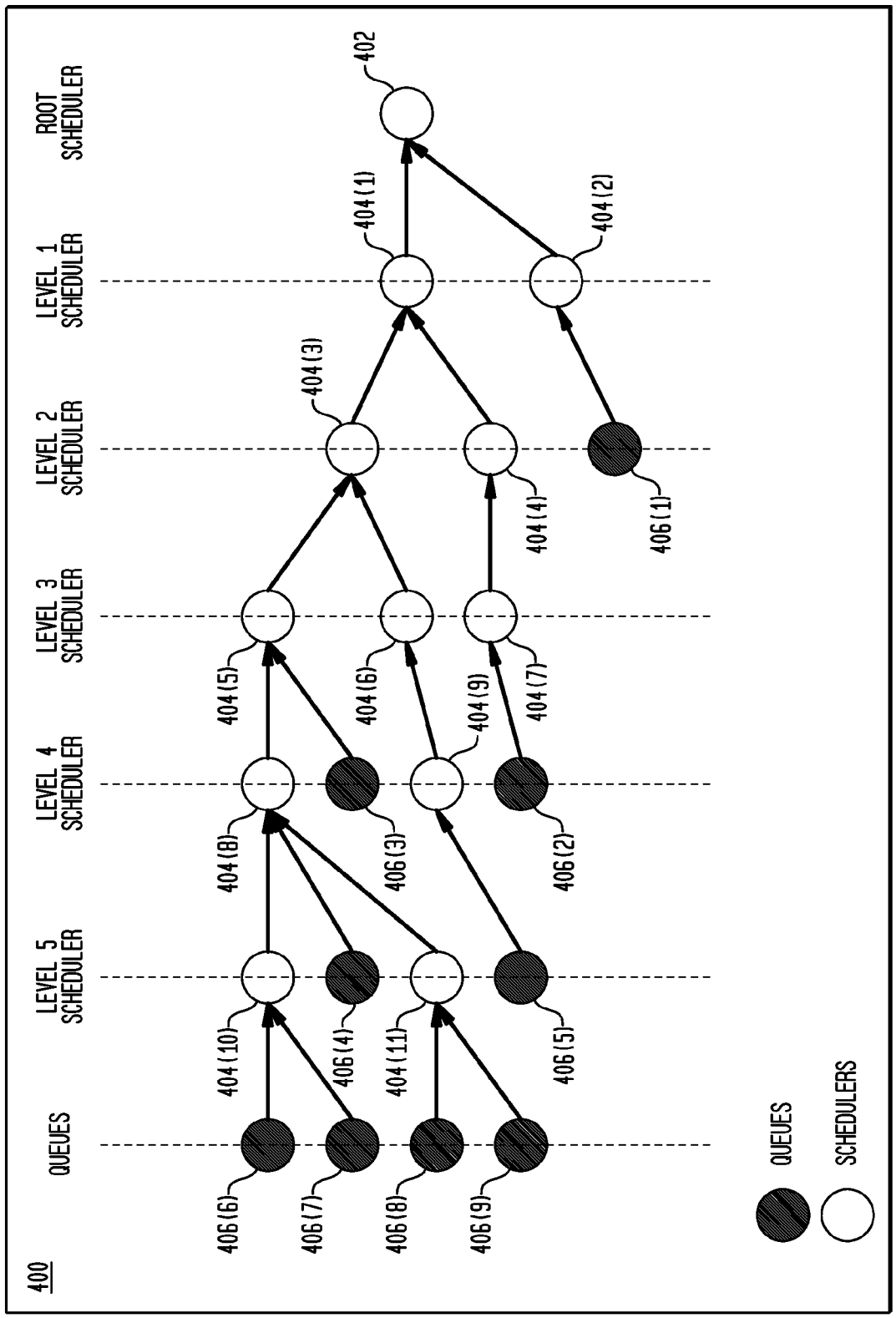
Figure 5:
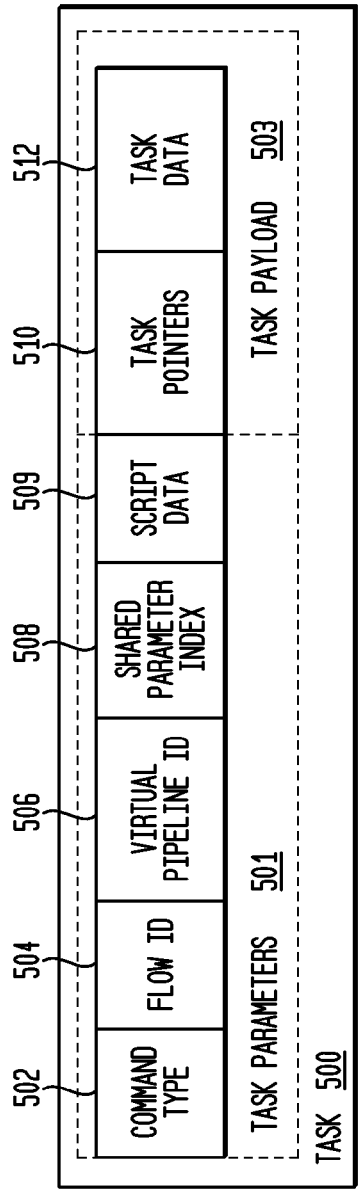
Figure 6:
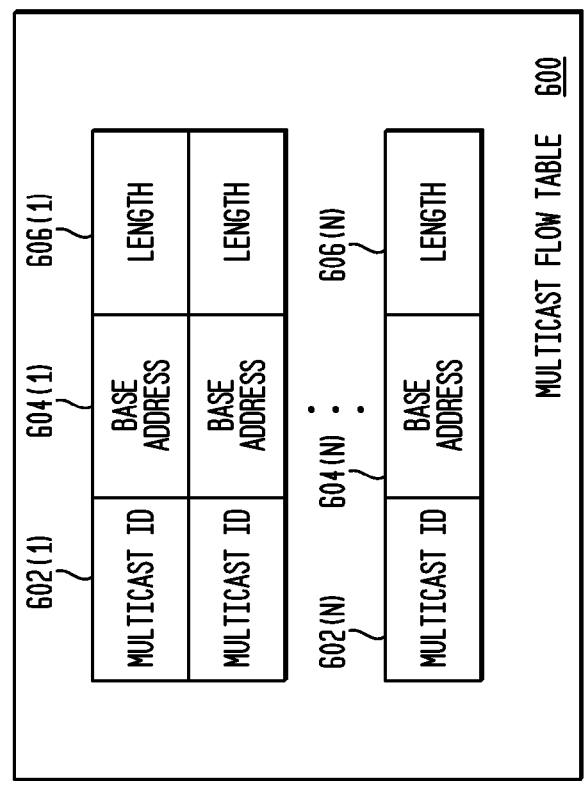
Figure 7:
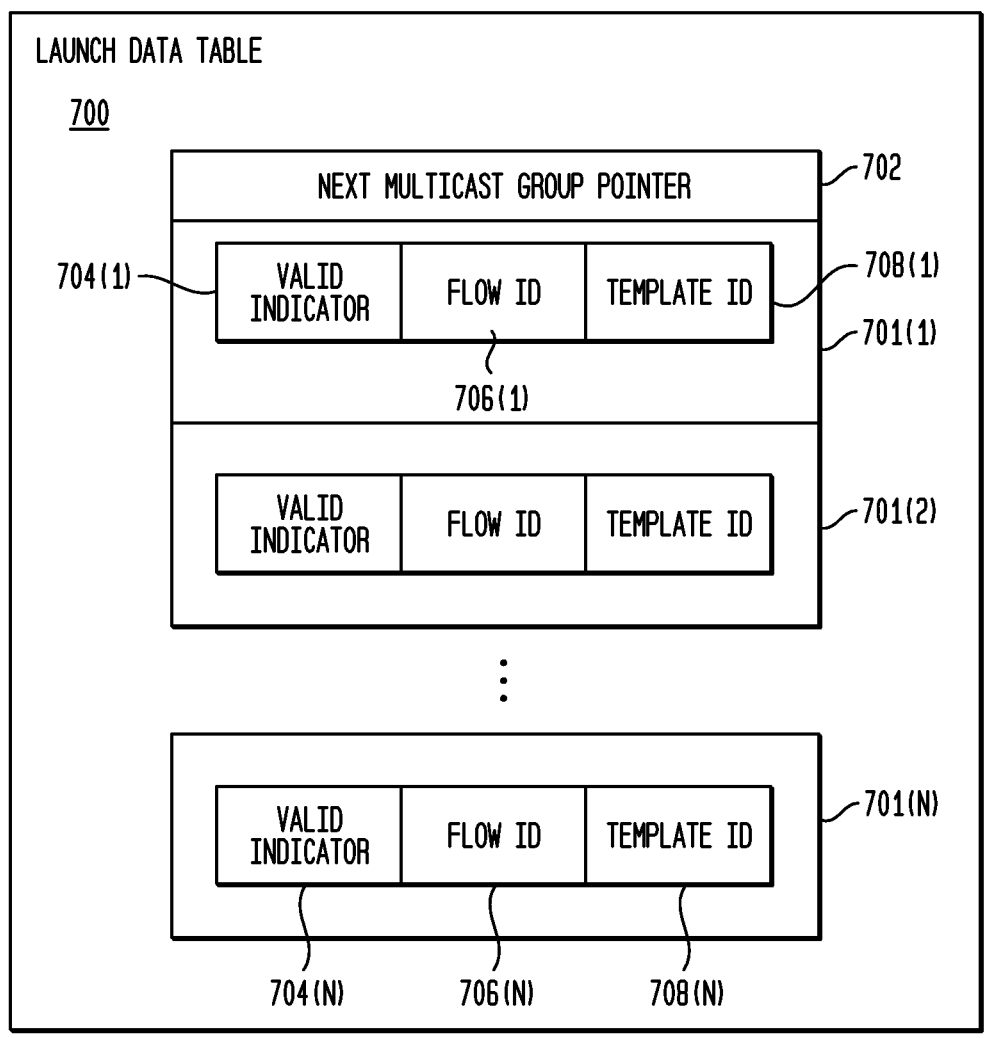
Figure 8:
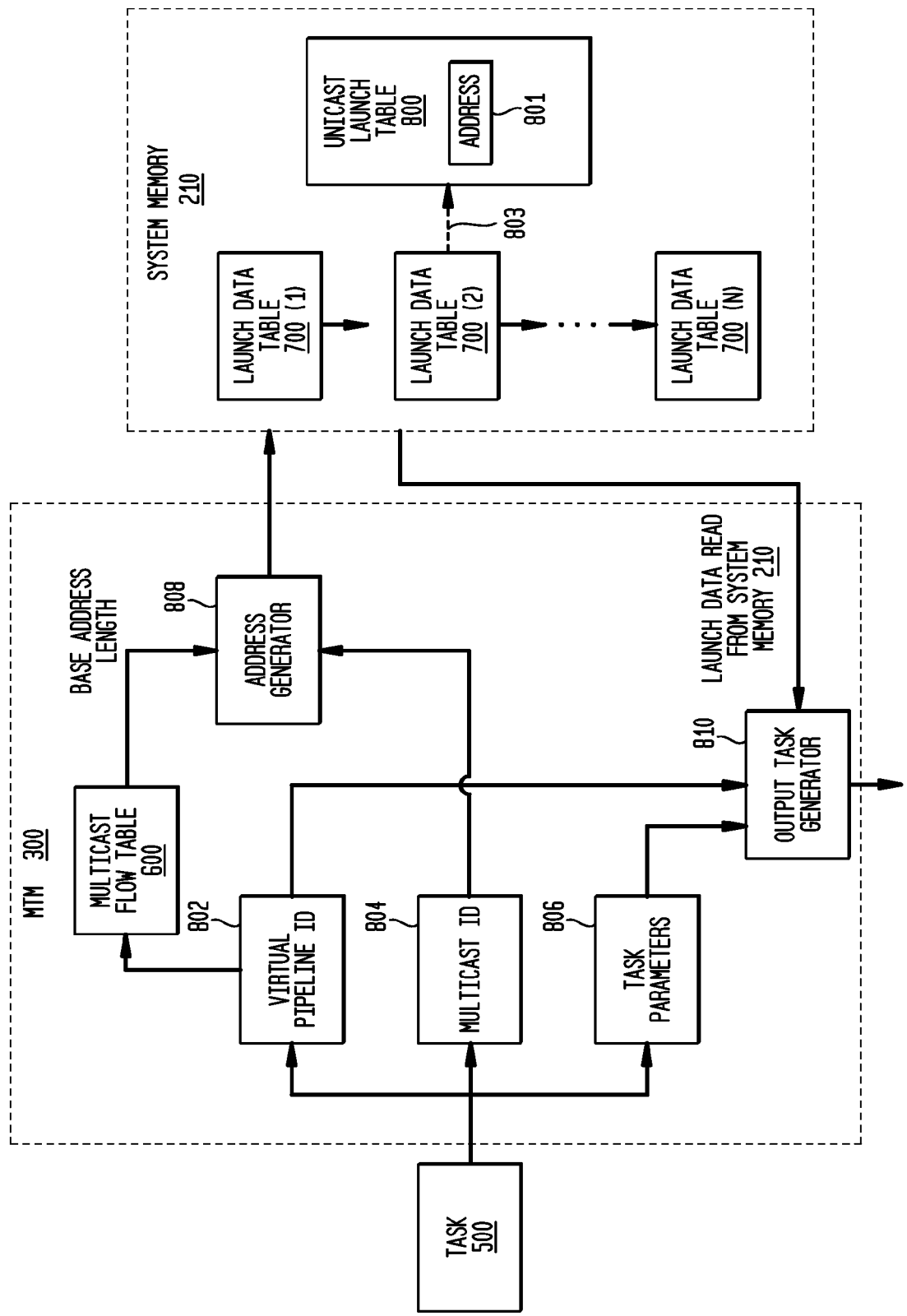
Figure 9:
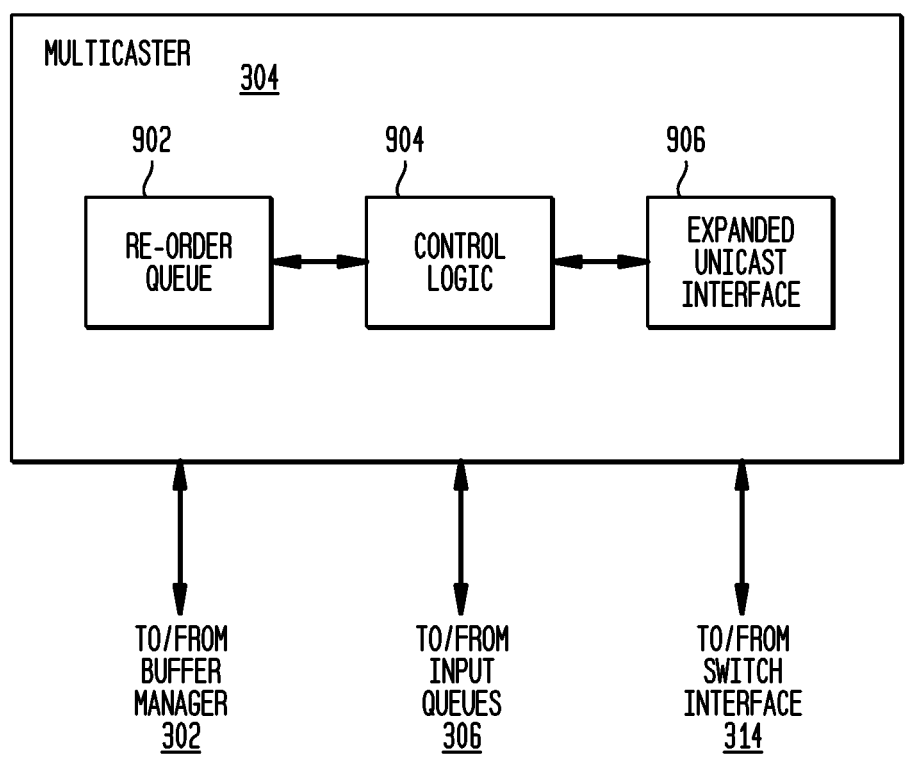
Figure 10:
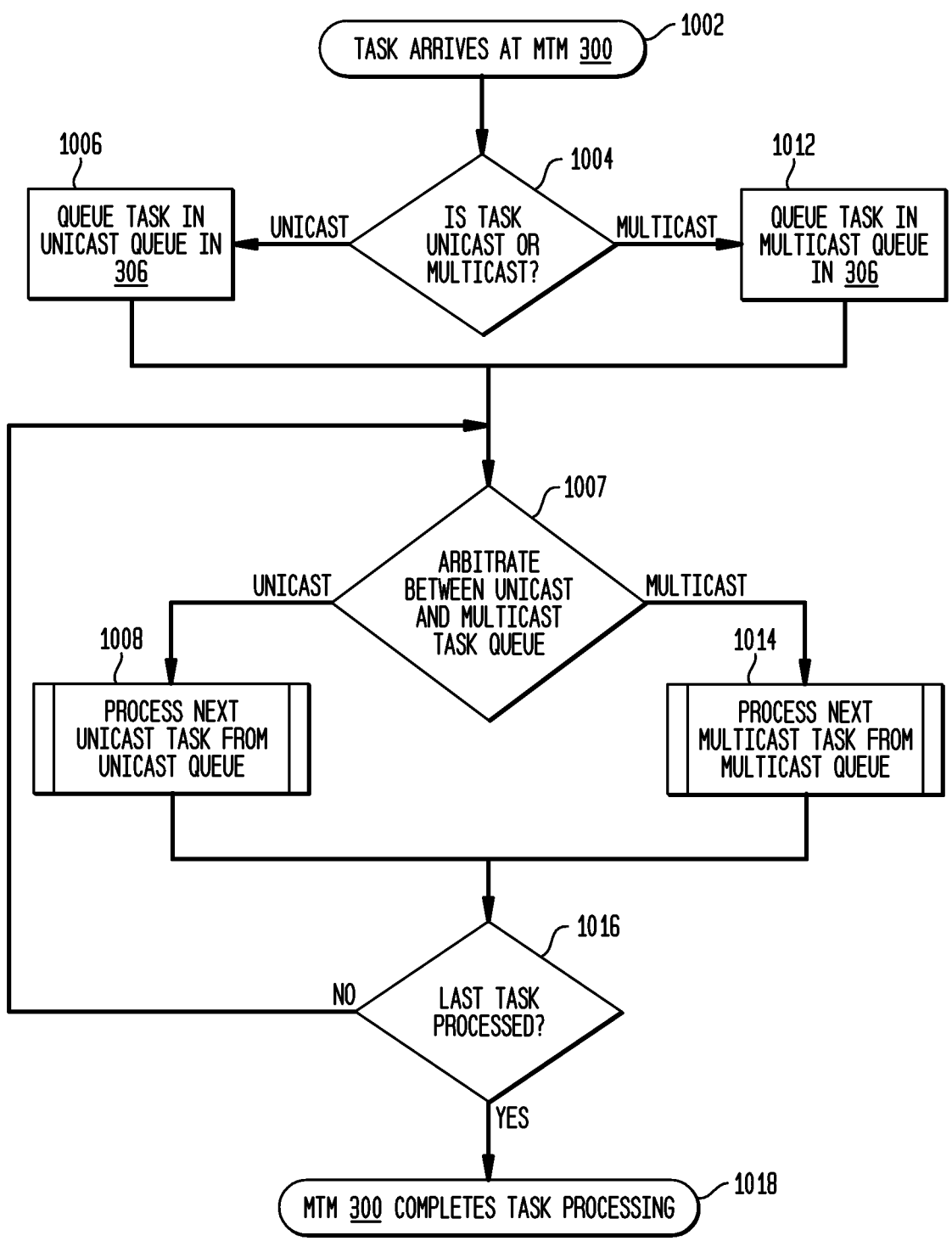
Figure 11:
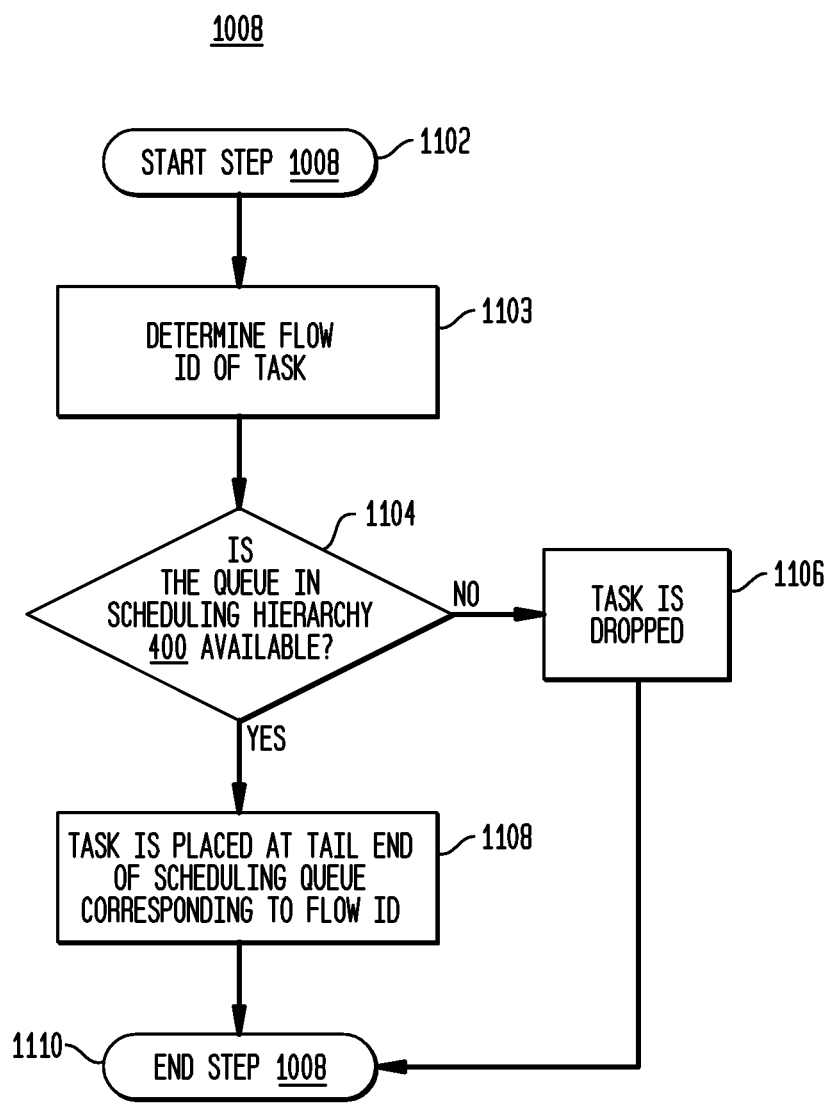
Figure 12:
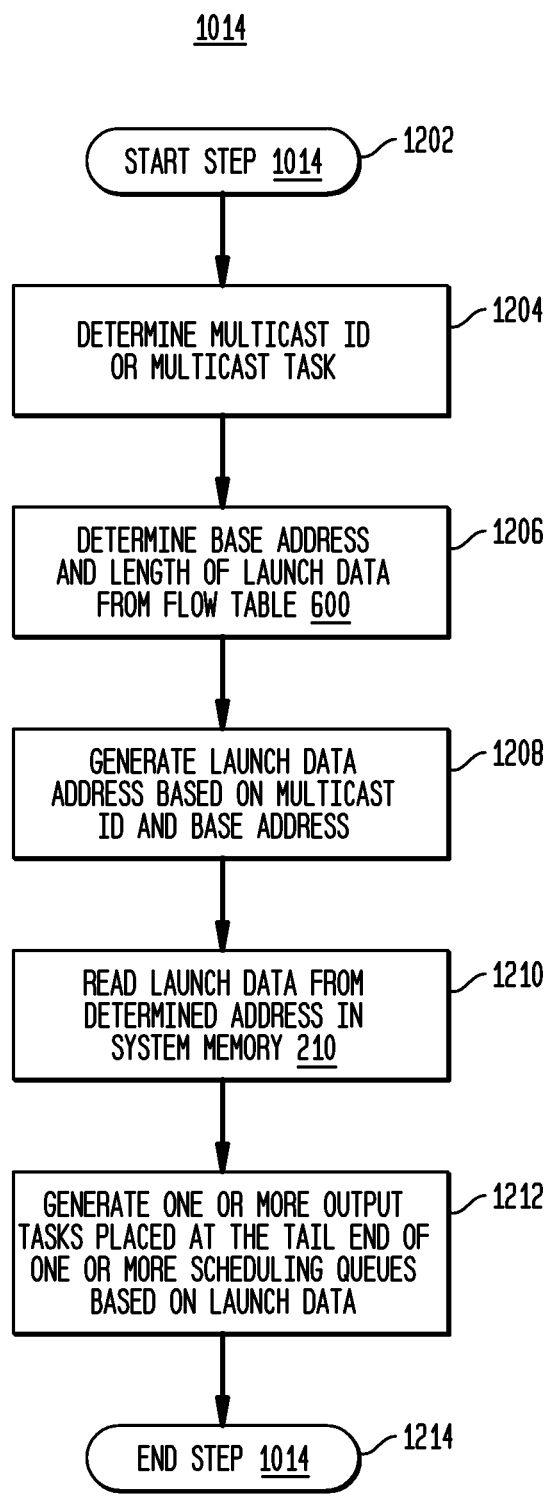

FIG. 4 shows an exemplary scheduler and queue hierarchy of the traffic manager of FIG. 3;

FIG. 5 shows an exemplary block diagram of a task provided to the traffic manager of FIG. 3;

FIG. 6 shows an exemplary block diagram of a task flow table for the traffic manager of FIG. 3;

FIG. 7 shows an exemplary block diagram of a launch data table for the traffic manager of FIG. 3;

FIG. 8 shows an exemplary logical block diagram of data structures of the traffic manager of FIG. 3;

FIG. 9 shows an exemplary block diagram of a multicaster block of the traffic manager of FIG. 3;

FIG. 10 shows an exemplary flow diagram of a task processing operation of the traffic manager of FIG. 3;

FIG. 11 shows an exemplary flow diagram of a unicast task processing sub-process of the task processing operation of FIG. 10; and FIG. 12 shows an exemplary flow diagram of a multicast task processing sub-process of the task processing operation of FIG. 10.

DETAILED DESCRIPTION

Figure 1:
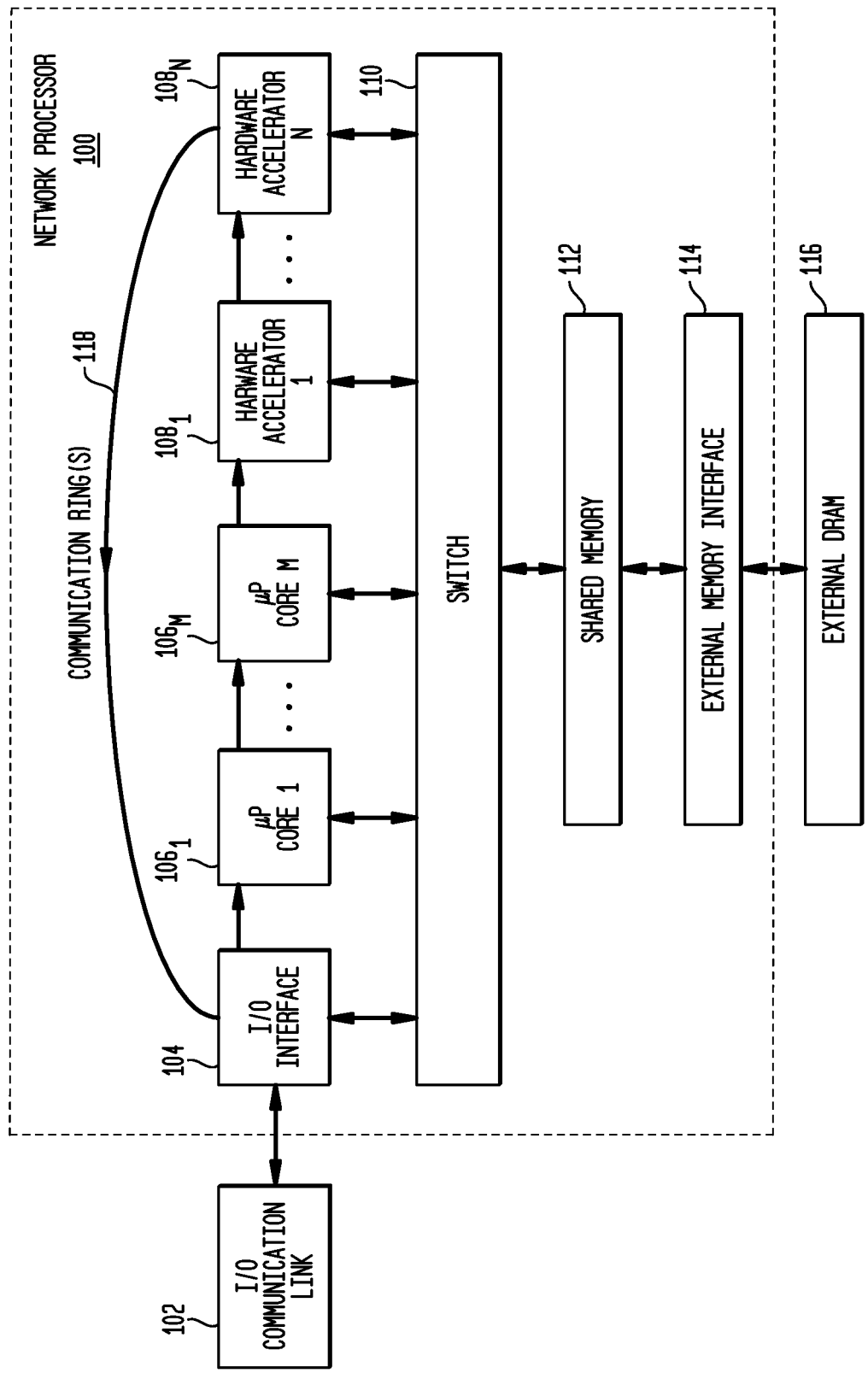
FIG. 1 shows a block diagram of a network processor operating in accordance with exemplary embodiments of the present invention.

Described embodiments of the present invention provide multicasting in a Modular Traffic Manager (MTM) for a multi-core, multi-threaded network processor that is implemented through one or more dynamic linked list structures stored in memory. Multicasting is taking an incoming task and sending it out on a number of unicast flows. Multicasting involves making copies of the input task, mapping the copies to expanded unicast flows (which in turn is mapped to a unicast flow), and incrementing a reference count of the protocol data unit (PDU) pointers. An input task parameter identifies a corresponding multicast group structure, via a flow- FIG. 1 shows a block diagram of an exemplary network processor system (network processor 100) implemented as a system-on-chip (SoC). Network processor 100 might be used for processing data packets, performing protocol conversion, encrypting and decrypting data packets, or the like. As shown in FIG. 1, network processor 100 includes on-chip shared memory 112, one or more input-output (I/O) interfaces collectively shown as I/O interface 104, one or more microprocessor (µP) cores $106_1$-$106_M$, and one or more hardware accelerators $108_1$-$108_N$, where M and N are integers greater than or equal to 1. Network processor 100 also includes external memory interface 114 for communication with external memory 116. External memory 116 might typically be implemented as a dynamic random-access memory (DRAM), such as a double-data-rate three (DDR-3) DRAM, for off-chip storage of data. In some embodiments, such as shown in FIG. 1, each of the one or more I/O interfaces, µP cores and hardware accelerators might be coupled through switch 110 to shared memory 112. Switch 110 might be implemented as a non-blocking crossbar switch such as described in related U.S. patent application Ser. No. 12/430,438 filed Apr. 27, 2009, Ser. No. 12/729,226 filed Mar. 22, 2010, and Ser. No. 12/729,231 filed Mar. 22, 2010, which are incorporated by reference herein.

I/O interface 104 might typically be implemented as hardware that connects network processor 100 to one or more external devices through I/O communication link 102. I/O communication link 102 might generally be employed for communication with one or more external devices, such as a computer system or networking device, which interface with network processor 100. I/O communication link 102 might be a custom-designed communication link, or might conform to a standard communication protocol such as, for example, a Small Computer System Interface ("SCSI") protocol bus, a Serial Attached SCSI ("SAS") protocol bus, a Serial Advanced Technology Attachment ("SATA") protocol bus, a Universal Serial Bus ("USB"), an Ethernet link, an IEEE 802.11 link, an IEEE 802.15 link, an IEEE 802.16 link, a Peripheral Component Interconnect Express ("PCI-E") link, a Serial Rapid I/O ("SRIO") link, or any other interface link. Received packets are preferably placed in a buffer in shared memory 112 by transfer between I/O interface 104 and shared memory 112 through switch 110.

In embodiments of the present invention, shared memory 112 is a conventional memory operating as a cache that might be allocated and/or subdivided. For example, shared memory 112 might include one or more FIFO queues that might be dynamically allocated to the various μP cores 106 and hardware accelerators 108. External memory interface 114 couples shared memory 112 to one or more external memories, shown as external memory 116, to provide off-chip storage of data not needed by the various μP cores 106 and hardware accelerators 108 to free space in shared memory 112. The μP cores and hardware accelerators might interact with each other, for example, by one or more communication bus rings 118 that pass "tasks" from a source core to a destination core. As described herein, tasks are instructions to the destination core to perform certain functions, and a task might contain address pointers to data stored in shared memory 112, as described in related U.S. patent application Ser. Nos. 12/782,379, 12/782,393, and 12/782,411, all filed May 18, 2010, which are incorporated by reference herein.

Network processor 100 might typically receive data packets from one or more source devices, perform processing operations for the received data packets, and transmit data packets out to one or more destination devices. As shown in FIG. 1, one or more data packets are transmitted from a transmitting device (not shown) to network processor 100, via I/O communication link 102. Network processor 100 might receive data packets from one or more active data streams concurrently from I/O communication link 102. I/O interface 104 might parse the received data packet and provide the received data packet, via switch 110, to a buffer in shared memory 112. I/O interface 104 provides various types of I/O interface functions and, in exemplary embodiments described herein, is a command-driven hardware accelerator that connects network processor 100 to external devices. Received packets are preferably placed in shared memory 112 and then one or more corresponding tasks are generated. Transmitted packets are preferably generated from data in shared memory 112 for one or more corresponding tasks and might be transmitted externally of network processor 100. Exemplary I/O interfaces include Ethernet I/O adapters providing integrity checks of incoming data. The I/O adapters might also provide timestamp data for received and transmitted packets that might be used to implement features such as timing over packet (e.g., specified in the standard recommendations of IEEE 1588). In alternative embodiments, I/O interface 104 might be implemented as input (receive) only or output (transmit) only interfaces.

The various μP cores 106 and hardware accelerators 108 of network processor 100 might include several exemplary types of processors or accelerators. For example, the various μP cores 106 might be implemented as Pentium® or Power PC® processors, or a combination of different processor types (Pentium® is a registered trademark of Intel Corporation, and Power PC® is a registered trademark of IBM). The various hardware accelerators 108 might include, for example, one or more function-specific modules, such as a Modular Packet Processor (MPP), a Packet Assembly Block (PAB), a Modular Traffic Manager (MTM), a Memory Management Block (MMB), a Stream Editor (SED), a Security Protocol Processor (SPP), a Regular Expression (RegEx) engine, and other special-purpose modules.

The SED is a software-driven accelerator that allows for editing of packets. The SED performs packet editing functions that might include adding and modifying packet headers as well as fragmenting or segmenting data (e.g., IP fragmentation). The SED receives packet data as well as parameters from tasks and a task specified per-flow state. The output of the SED can become the outgoing packet data and can also update task parameters.

The RegEx engine is a packet search engine for state-based cross-packet pattern matching. The RegEx engine is multi-threaded accelerator. An exemplary RegEx engine might be implemented such as described in U.S. Pat. No. 7,439,652 or U.S. Patent Application Publication No. 2008/0270342, the teachings of which are incorporated by reference herein in their entireties.

The SPP provides encryption/decryption capabilities and is a command-driven hardware accelerator, preferably having the flexibility to handle protocol variability and changing standards with the ability to add security protocols with firmware upgrades. The ciphers and integrity (hash) functions might be implemented in hardware. The SPP has a multiple ordered task queue mechanism, discussed in more detail below, that is employed for load balancing across the threads.

The MMB allocates and frees memory resources in shared memory 112. Memory is allocated for such applications as task FIFO storage, packet data storage, hash-table collision handling, timer event management, and traffic manager queues. The MMB provides reference counts to each block of memory within shared memory 112. Multiple reference counts allow for more efficient storage of information, such as multicast traffic (data to be sent to multiple destinations) or for retransmission. Multiple reference counts remove a need for replicating data each time the data is needed. The MMB preferably tracks the memory allocations using a stack-based approach since a memory block recently released is preferably the next block to be allocated for a particular task, reducing cache trashing and cache tracking overhead. Blocks in shared memory 112 might be dynamically allocated by the MMB to store data, with the blocks in one of the following sizes: 256, 2048, 16384, and 65536 bytes. The MMB might operate substantially as described in related U.S. patent application Ser. No. 12/963,895 filed Dec. 9, 2010, which is incorporated by reference herein.

The PAB is a command driven hardware accelerator providing a holding buffer with packet assembly, transmit, retransmit, and delete capabilities. An incoming task to the PAB can specify to insert/extract data from anywhere in any assembly buffer. Gaps are supported in any buffer. Locations to insert and extract can be specified to the bit level. Exemplary traditional packet reassembly functions might be supported, such as IP defragmentation. The PAB might also support generalized holding buffer and sliding window protocol transmit/retransmit buffering, providing an offload for features like TCP origination, termination, and normalization. The PAB might operate substantially as described in related U.S. patent application Ser. No. 12/971,742 filed Dec. 17, 2010, which is incorporated by reference herein.

The MPP is a multi-threaded special purpose processor that provides tree based longest prefix and access control list classification. The MPP also has a hardware hash-based classification capability with full hardware management of hash-table additions, deletions, and collisions. Optionally associated with each hash entry is a timer that might be used under software control for tasks such as connection timeout and retransmission timing. The MPP contains a statistics and state management engine, which when combined with the hash table and timer facilities, provides support for state-based protocol processing. The MPP might support millions of flows, limited only by the amount of DRAM capacity assigned to the functions. The MPP architecture might be able to store all per thread states in memory instead of in register files. The MPP might operate substantially as described in related U.S. patent application Ser. No. 12/974,477 filed Dec. 21, 2010, Ser. Nos. 12/975,823, 12/975,880, 12/976,045, and 12/976,228 all filed Dec. 22, 2010, which are incorporated by reference herein. The MPP might also include hash functionality such as described in related U.S. patent application Ser. Nos. 13/046,717, 13/046,719, and 13/046,726 all filed Mar. 12, 2011, which are incorporated by reference herein.

As will be described herein, the MTM is a software-driven accelerator that provides packet scheduling and possibly up to six levels of scheduling hierarchy. The MTM might support millions of queues and schedulers (enabling per flow queuing if desired). The MTM might provide support for shaping and scheduling with smooth deficit weighed round robin (SD-WRR) for every queue and scheduler. The MTM might also support multicasting. Each copy of a packet is scheduled independently and traverses down different virtual pipelines enabling multicast with independent encapsulations or any other processing. The MTM might also contain a special purpose processor that can be used for fine-grained control of scheduling decisions. The MTM might be used to make discard decisions as well as scheduling and shaping decisions.

Figure 2:
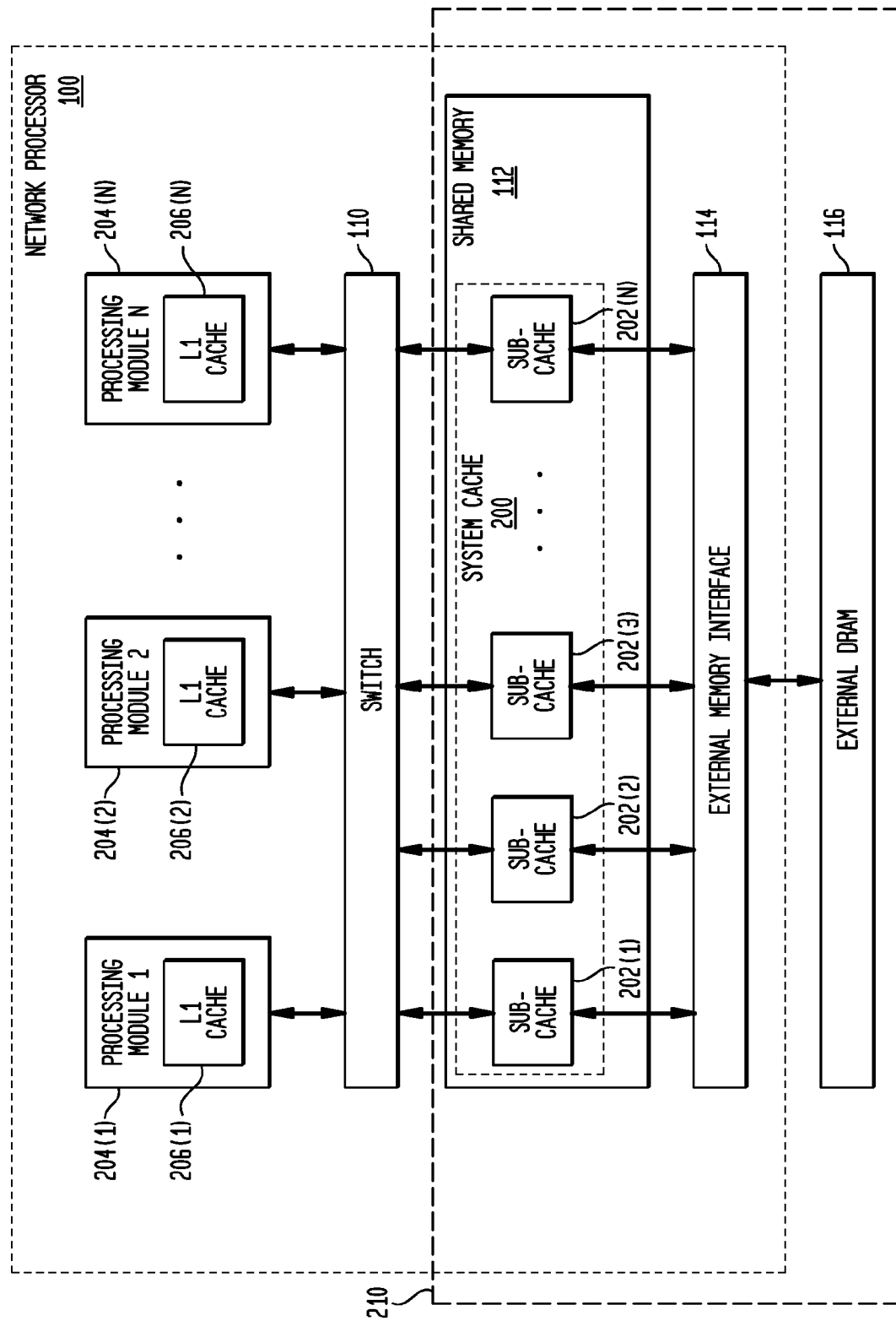
FIG. 2 shows a block diagram of a system cache of the network processor of FIG. 1.

FIG. 2 shows a block diagram of an exemplary embodiment of system cache 200 of network processor 100, in accordance with embodiments of the present invention. As shown in FIG. 2, system cache 200 might be implemented in shared memory 112. System cache 200 might include one or more sub-caches, shown as sub-caches 202(1)-202(N). Sub-caches 202(1)-202(N) might be employed to cache data from any μP core or accelerator (e.g., μP cores 106 or accelerators 108) of network processor 100. As indicated by dashed line 210, shared memory 112 and external memory 116 might generally be referred to as system memory 212.

As described in related U.S. patent application Ser. Nos. 12/782,379, 12/782,393, and 12/782,411, which are incorporated by reference herein, sub-caches 202(1)-202(N) might be addressed via switch 110 in such a way as to balance access to the caches, referred to herein as striping, helping to avoid hot spots in shared memory 112, improve performance of the caching in and out of external memory 116, and reduce cache access bottlenecks. Thus, in embodiments of the present invention, each sub-cache 202(1)-202(N) might form a memory array, and the number of system caches might preferably be implemented as a power of two. One or more memory blocks might be allocated to each sub-cache 202(1)-202(N). In embodiments of the present invention, each sub-cache 202(1)-202(N) might be implemented as an N-way associative cache employing a least recently used (LRU) caching algorithm. In some embodiments, each sub-cache 202(1)-202(N) might have a total size of 512 kB and a cache line length of 256 B.

As shown in FIG. 2, one or more of processing modules 204(1)-204(N) might have a corresponding local level one (L1) cache, shown as L1 caches 206(1)-206(N). The function of L1 caches 206(1)-206(N) is to act as an interface to system cache 200 for client processing modules 204(1)-204(N) of network processor 100. L1 caches 206(1)-206(N) might be referred to as "pipeline" caches, since L1 caches 206(1)-206(N) might typically be employed only for certain ones of client processing modules 204(1)-204(N) that access system cache 200 as part of an execution pipeline.

FIG. 3 shows a block diagram of an exemplary embodiment of MTM 300 of network processor 100, in accordance with embodiments of the present invention. In described embodiments, MTM 300 might typically serve as a processing node of one or more of the virtual pipelines for task processing in network processor 100. As described herein, a virtual pipeline defines a processing order of a task through one or more of the processing modules of network processor 100. Typically, MTM 300 might, for example, serve as a mid-point processing module in a virtual pipeline for unicast packets (e.g., a packet being sent to a single network node). MTM 300 might also typically serve as a beginning processing node of a virtual pipeline for multicast packets (e.g., a packet being sent to multiple network nodes).

As shown in FIG. 3, MTM 300 accesses system memory 210 via an interface to switch 100, shown as interface 314, and MTM 300 might interface to one or more clock networks and timer signals of network processor 100 via timers and clocks interface 320. MTM 300 includes one or more interfaces to various ring communication buses of network processor 100, for example, memory manager interface 316 might interface to the MMB of network processor 100 via a memory manager ring bus, backpressure ring interface 318 that might interface to one or more processing modules 204 via a backpressure ring bus, configuration ring interface 322 that might interface to a configuration manager of network processor 100, and task ring interface 324 which might transfer tasks between one or more processing modules 204 of network processor 100. In general, the one or more ring buses might function substantially as described in related U.S. patent application Ser. No. 12/782,379 filed May 18, 2010, for example by passing a task from source processing module to a destination processing module. The configuration manager of network processor 100 might function substantially as described in related U.S. patent application Ser. No. 13/192,140, filed Jul. 27, 2011, for example by configuring processing modules of network processor 100 by interfacing with the configuration ring buses, the system memory, a debugging interface or internal or external control processors, and ensuring memory coherency between different memories and caches within network processor 100.

As described herein, network processor 100 might generally send and receive data packets, for example, an IP packet, and each packet might have one or more corresponding tasks sent between processing modules of network processor 100 for processing of the packet data. As shown in FIG. 3, MTM 300 includes buffer manager 302, multicaster 304, one or more input queues 306, queue engine 308, scheduler 310 and control logic and registers 312. As will be described, tasks received by MTM 300 are placed in one of a plurality of queues, shown as input queues 306, until the tasks can be scheduled by scheduler 310 for transmission by network processor 100. Typical task source processing modules for MTM 300 include: i) the MPP; ii) the PAB; iii) an error checking module of network processor 100, for example a processing module that implements a checksum or other error correction for packets to be transmitted by network processor 100; and iv) one or more control processors of network processor 100 (e.g., one of μP cores 106), for example when a control packet is inserted in the output stream of network processor 100. Typical destination processing modules for tasks sent by MTM include: i) Stream Editor (SED) since packet data might require editing prior to transmission by network processor 100; ii) the error checking module of network processor 100, for example if checksum or other error correction data needs to be recalculated for packets to be transmitted by network processor 100; and iii) one or more control processors of network processor 100 (e.g., one of µP cores 106), for example when a packet requires additional processing before transmission by network processor 100.

In some embodiments, input queue block 306 might include four input task queues (not shown). Two of the input task queues might be employed to queue low and high priority unicast packets, and the second pair of task queues might be employed to queue low and high priority multicast packets. This separation of unicast and multicast input queues is beneficial since multicast tasks typically take longer to enqueue than unicast tasks, since multiple copies of tasks are placed in corresponding queues for multicast tasks. MTM 300 queues tasks of the same type in the same task queue in order. MTM 300, via scheduler 310, might implement a programmable weighted round-robin service policy between the Unicast and Multicast task queues of input queue block 306. High priority task queues might generally be scheduled before low priority task queues.

FIG. 4 shows an exemplary scheduler and queue hierarchy 400 of MTM 300. As shown in FIG. 4, scheduling hierarchy 400 includes one or more queues 406 and one or more schedulers 404, as well as a root scheduler 402. Root scheduler 402 is the first level of scheduling hierarchy 400 and can schedule either queues 406 or other schedulers 404 since, as shown in FIG. 4, each level of scheduling hierarchy 400 other than the root level can contain either queues 406 or other schedulers 404. Each scheduler 404 might schedule tasks from a plurality of queues 406 in its level. A queue is a leaf node of scheduling hierarchy 400, and might typically be a FIFO of tasks corresponding to a packet of network processor 100. A given scheduler 404 might also schedule tasks from one or more other schedulers in its level. If there are other schedulers under a given scheduler, there is another level of hierarchy in scheduling tasks. Some embodiments of scheduling hierarchy 400 might include up to seven levels of scheduling hierarchy and allow a maximum of 32 child nodes under root scheduler 402.

Queues might typically exist at any level of scheduling hierarchy 400 other that the root level, which might only contain schedulers to subsequent levels of hierarchy 400. In described embodiments of scheduling hierarchy 400, any node in the hierarchy might have up to 64 k child nodes. Root scheduler 402 and each scheduler 406 in scheduling hierarchy 400 arbitrates between the children of this particular scheduler to pick a task to be scheduled for transmission by MTM 300. Further, root scheduler 402 and each scheduler 406 perform traffic shaping for the particular scheduling node to shape the traffic to a particular rate. In some embodiments, each scheduler 406 and root scheduler 402 might selectably perform Smooth Deficit Weighted Round Robin (SDWRR), Deficit Weighted Round Robin (DWRR) or Strict Priority arbitration between queues 404 and schedulers 406 under it.

In some embodiments MTM 300 supports three types of tasks: Unicast, Expanded Unicast and Multicast. For unicast tasks, a previous processing module in a given virtual pipeline of network processor 100 includes with the task a queue identifier for a queue of MTM 300 where the task should be queued. For example, FIG. 5 shows an exemplary task, 500, that might be provided to MTM 300. As shown in FIG. 5, task 500 might typically include one or more task parameters 501 and task payload 503. As shown, task parameters 501 might include a command type field 502, a Flow ID field 504, a virtual pipeline ID field 506, a shared parameter index field 508, and script data 509. In general, task parameters 501 might include MTM-specific information for scheduling the incoming task (e.g., command type field 502, flow ID field 504, and virtual pipeline ID field 506). Task payload 503 might include task pointers 510 and task data 512. Task pointers 510 might point to addresses in system memory 210 storing data corresponding to the task. Task data 512 might include some of the data corresponding to the task (inline data). Command type field 402 identifies the task as a unicast task, an expanded unicast task, or a multicast task.

For a received unicast task, MTM 300 places at most one task in one of its queues in block 306. For each unicast task, the previous processing module in the virtual pipeline for the task (e.g., the one of accelerators 108 that provides the task to MTM 300) provides MTM 300 with a queue ID for the task to be placed in, for example a queue identified by flow ID field 504. For unicast tasks, virtual pipeline ID field 506 might be employed to correct packet length for scheduling of a packet corresponding to the task, for example by adding or subtracting the number of bytes corresponding to the value of field 506. In some embodiments, shared parameter index field 508 might include a pointer index to an entry in a shared parameter table of MTM 300 to run script data corresponding to the task.

The shared parameter table might be stored in one or more L1 caches of MTM 300 (not shown in FIG. 3). The one or more L1 caches of MTM 300 might operate substantially as described in related U.S. patent application Ser. Nos. 13/192, 104 and 13/192,187, both filed Jul. 27, 2011. The shared parameter table might include one or more parameters for processing the unicast task, for example, shared parameters can be used to store state data (for example, statistics of MTM 300 such as packet count or byte count) based on an input metric (for example, counting all packets originating from a single port destined to a given queue of MTM 300). When MTM 300 receives a unicast task, a template merge operation is performed on the task that extracts MTM-specific fields from the task (e.g., command type field 502, flow ID field 504, and virtual pipeline ID field 506) and determines a queue for the task (e.g., a queue ID value from flow ID field 504). Buffer manager 302 also determines if MTM 300 can accept the new task for scheduling, for example if the queue of scheduling hierarchy 400 corresponding to the task is not filled beyond a threshold. If the task is accepted, the task is placed at the tail end of the corresponding MTM queue identified by flow ID field 504. If the task cannot be accepted by a queue of scheduling hierarchy 400, the task might be dropped and removed from the MTM pipeline. The threshold decision to determine whether a task can or cannot be accepted by a given queue might be performed by control software running on a microprocessor of network processor 100.

Expanded unicast tasks are tasks corresponding to unicast packets, but the task does not contain any a queue ID in flow ID field 504. Thus, the virtual pipeline down which the expanded unicast tasks were sent within network processor 100 terminates at MTM 300. MTM 300 determines one or more destination processing modules or a new virtual pipeline for the expanded unicast task. In some embodiments, MTM 300 includes a flow table for storing a pointer to an area of system memory 210 that contains launch data for expanded unicast and multicast tasks. An incoming expanded unicast or multicast task includes a flow ID in flow ID field 404 that points to a corresponding entry in the flow table.

Multicast tasks are duplicated by multicaster 304 such that the task is stored in multiple queues of MTM 300 to be sent to multiple destinations. A multicast task includes a flow ID in field 504, which points to a sequence of expanded unicast flow IDs that are used when duplicating the task.

Each queue in block 306 might be implemented as a FIFO queue pointing to task data stored in system memory 210. Each FIFO might be implemented as one or more 2 KB blocks that can be dynamically linked to additional memory blocks, for example such as described in related U.S. patent application Ser. No. 13/046,717, filed Mar. 12, 2011.

As described herein, embodiments of the present invention employ one or more dynamic linked list structures ("multicast group structures") to generate one or more copies of an input task corresponding to a multicast packet. A received multicast input task is mapped to a multicast group structure via a configurable flow table such as multicast task flow table 600 of FIG. 6. As shown in FIG. 6, multicast flow table 600 includes up to N entries, each entry includes multicast ID 602(1)-602(N), base address 604(1)-604(N) and length field 606(1)-606(N). As described herein, flow ID 504 of a received multicast task might include a multicast ID value corresponding to one of multicast IDs 602(1)-602(N) of flow table 600. Each multicast ID 602(1)-602(N) includes a corresponding base address 604(1)-604(N) that corresponds to a base memory address of launch data corresponding to the multicast ID, and a corresponding length field 606(1)-606(N) that corresponds to one or more multicast data structures stored at the base address corresponding to the multicast ID. In some embodiments of the present invention, the one or more multicast data structures might include one or more expanded unicast entries that correspond to launch data for a given destination for the multicast task corresponding to the multicast ID value.

The base address points to an address within launch data table 700, shown in FIG. 7. As shown in FIG. 7, launch data table 700 includes one or more launch data entries 701(1)-701(N). Each launch data entry 701 might begin at a base address corresponding to base addresses 604(1)-604(N) of multicast flow table 600, and has a data length corresponding to length fields 606(1)-606(N) of flow table 600. As shown, each launch data entry 701(1)-701(N) might include a valid indicator 704, a Flow ID 706 and a template ID 708. Additionally, launch data table 700 might include a header entry, shown in FIG. 7 as next multicast group pointer 702, that contains a pointer to a next node of the linked list of multicast task groups for the flow corresponding to the received task. Each launch data table 700 might store a series of expanded unicast Flow IDs. In described embodiments, each launch data table 700 is stored in a 256 B block in system memory 210. Each 256 B block stores 63 four-byte pointers, shown as launch data entries 701(1)-701(N). The first four bytes of each launch data table 700 are used to point to the next 256 B block in memory, shown as next multicast group pointer 702.

Launch data table 700 might be dynamically generated and updated by MTM 300. Multicast flow table 600 might typically be stored in a flow table memory of multicaster 304, and launch data table 700 might typically be stored in system memory 210. In general, each entry of launch data table 700 might correspond to an expanded unicast flow stored in a linked list of tasks. Upon reading launch data table 700, scheduler 310 might create a multicast copy of the task flow at the end of the linked list of launch data table 700.

An exemplary logical diagram of multicast processing and data structures is shown in FIG. 8. As shown in FIG. 8, task 500 is received by MTM 300. MTM 300 determines a virtual pipeline ID 802, a multicast ID 804, and one or more task parameters 806 from task 500. For example, multicast ID 804 might be determined from flow ID field 504, virtual pipeline ID 802 might be determined from virtual pipeline ID field 506, and task parameters 806 might be determined from task parameters 501 task 500. Virtual pipeline ID 802 is employed to determine a base address and length stored in multicast flow table 600 for launch data corresponding to the virtual pipeline ID of task 500. Based on the base address and length retrieved from multicast flow table 600, and multicast ID 804, address generator 808 generates an address in system memory 210 for one or more launch data tables 700(1)-700(N). Based on the address generated by address generator 808 and pointers 702 of the one or more launch data tables 700(1)-700(N), MTM 300 reads launch data from system memory 210 corresponding to task 500. The launch data is provided to output task generator 810 of scheduler 310 along with virtual pipeline ID 802 and task parameters 806. Based upon the launch data read from system memory 210, virtual pipeline ID 802, and task parameters 806, output task generator 810 (e.g., of scheduler 310) generates one or more output tasks to be placed in one or more queues of scheduling hierarchy 400 based on the launch data read from tables 700.

For example, in some embodiments of the present invention, the corresponding launch data tables 700(1)-700(N) might provide one or more expanded unicast entries corresponding to the multicast ID value, where each expanded unicast entry corresponds to a given destination for the multicast task. In such embodiments, each expanded unicast entry might then correspond to an address in unicast launch table 800, as indicated by dashed line 803. As indicated by line 803, launch data tables 700(1)-700(N) are read by MTM 300, resulting a unicast launch data read request for each corresponding expanded unicast flow ID read from launch data tables 700(1)-700(N), address in unicast launch table 800 corresponds to the address of launch data in system memory 210, shown as address 801. The launch data is read from address 801 in system memory 210 for each expanded unicast entry, and is provided to output task generator 810.

As shown in FIG. 7, launch data might typically contain an identifier, shown as template ID 706, for a task template to employ in generating one or more output tasks of MTM 300 for each received input task. MTM retrieves the given task template from a template RAM (not shown) within MTM 300, and provides the task template, other launch data and the one or more parameters included in the input task to output task generator 810 of scheduler 310. As described herein, a task template is a structure employed by each processing module of network processor 100 (e.g., MTM 300) to form an output task, for example determining output task header fields and to select parameters and other data to be put in the output task. Output task generator 810 of scheduler 310 generates a unicast output task of MTM 300 based on the task template and task parameters 806.

FIG. 9 shows additional detail of multicaster 304. Multicaster 304 ensures tasks sent to the same multicast group ID are put into a given queue of MTM 300 in the order in which they should be transmitted. As shown in FIG. 9, multicaster 304 includes control logic 904, which generates the address of the launch table data for a received task (for example, shown in FIG. 8 as address generator 808). Control logic 904 might also include memory to store flow table address mapping (for example, shown in FIG. 8 as multicast flow table 600). Re-order queue 902 might be employed to re-order each expanded unicast task corresponding to a multicast flow such that each expanded unicast task is written into re-order queue 902 based on the corresponding flow ID, but is read out of re-order queue 902 with each expanded unicast task in order for each corresponding flow ID. Expanded unicast interface 906 sends the expanded unicast flow IDs from reorder queue 902, along with task parameters and data, to queue engine 308 to be scheduled for transmission by MTM 300.

Multicast tasks received by MTM 300 are duplicated by multicaster 304. As described herein, each task includes a flow ID and a multicast ID. The flow ID and multicast ID are translated into a memory address of launch data table 700 by the calculation: Memory Address=Base Address+(Multicast ID<<8). As described in regard to FIG. 6, the memory address corresponds to a location in launch data table 700 that stores a sequence of expanded unicast flow IDs that are used to duplicate the task. For each copy of the multicast task that MTM 300 generates to schedule each multicast transmission, MTM 300 provides the flow ID and the parameters obtained from the received task to expanded unicast interface 906 for processing each duplicated expanded unicast task corresponding to the received multicast task.

Multicaster 304 performs operations on one multicast task at a time by removing an entry of a multicast queue (e.g., a queue in block 306) and retrieving the corresponding task parameters and task data. As described herein, the flow ID and the multicast ID are used to generate address in system memory 210 where the expanded unicast flow IDs for the multicast task are stored (e.g., in launch data table 700). Multicaster 304 reads the expanded unicast flow IDs from launch data table 700, and provides the one or more expanded unicast flow IDs and multicast ID to expanded unicast interface 906 for each valid flow ID in launch data table 700.

FIG. 10 shows an exemplary flow diagram of task process 1000 of MTM 300. At step 1002, a task is received by MTM 300. At step 1004, MTM 300 determines whether the received task is a unicast task or a multicast task, for example based on a value of command type 502 of the received task. At step 1004, if the received task is a unicast task, at step 1006, the received task is queued in a unicast task queue of block 306. As described herein, the unicast task queue might be one or more FIFO queues, for example a high priority unicast task queue and a low priority unicast task queue. At step 1004, if the received task is a multicast task, at step 1012 the received multicast task is queued in a multicast queue of block 306. As described herein, the multicast task queue might be one or more FIFO queues, for example a high priority multicast task queue and a low priority multicast task queue.

At step 1007, MTM 300 arbitrates between the unicast and multicast task queues, for example based on a round robin arbitration algorithm, or other arbitration technique. If, at step 1007, MTM 300 selects the unicast task queue, task process 1000 continues to step 1008. At step 1008, a next unicast task is processed from the unicast task queue. If, at step 1007, MTM 300 selects the multicast task queue, task process 1000 continues to step 1014. At step 1014, MTM 300 processes a next multicast task from the multicast task queue. At step 1016, if there are additional tasks in any unicast or multicast queue, process 1000 returns to step 1007 to arbitrate between the unicast and multicast queues to process a next task from one of the queues. At step 1016, if there are no additional multicast tasks in the queue, process 1000 proceeds to step 1018, where process 1000 completes.

FIG. 11 shows grater detail of step 1008 of FIG. 10 for processing unicast tasks. As shown in FIG. 11, sub-process 1008 starts at step 1102. At step 1103, a flow ID of the received unicast task is determined, for example based on the value of flow ID field 504. At step 1104, if the queue in scheduling hierarchy 400 (e.g., one of queues 406) corresponding to the flow ID determined at step 1103 is available to receive a new task, then at step 1108, the task is placed at the tail end of the corresponding scheduling queue. At step 1104, if the queue in scheduling hierarchy 400 (e.g., one of queues 406) corresponding to the flow ID determined at step 1103 is not available to receive a new task (e.g., the queue is filled beyond a threshold), then at step 1106, the task is dropped. At step 1110, sub-process 1008 completes.

FIG. 12 shows greater detail of step 1014 of FIG. 10 for processing multicast tasks. As shown in FIG. 12, sub-process 1014 starts at step 1202. At step 1204, a multicast ID of the multicast task is determined, for example based on the value of flow ID field 504. At step 1206, a base address and length of launch data stored in multicast flow table 600 is determined based on the multicast ID value determined at step 1204. At step 1208, an address of the launch data in system memory 210 is generated based on the multicast ID value and the base address value, for example by address generator 808. At step 1210, MTM 300 reads the launch data from system memory 1210 based on the generated address and the length value. Although not specifically shown in FIG. 12, as described in regard to FIG. 8, the launch data address might provide one or more expanded unicast entries corresponding to the multicast ID value, where each expanded unicast entry corresponds to a given destination for the multicast task. Each expanded unicast entry might then correspond to an address in a unicast launch table, and the address in the unicast launch table corresponds to the address of launch data in system memory 210. At step 1210, the launch data is read from the address in system memory 210 for each expanded unicast entry. At step 1212, MTM 300 generates one or more output tasks corresponding to the received multicast task. Each of the one or more output tasks corresponds to a flow ID contained in the launch data read at step 1210. The one or more output tasks are placed at the tail end of corresponding scheduler queues of hierarchy 400 (e.g., one of queues 406) based on the launch data. At step 1214, sub-process 1014 completes.

Described embodiments might provide a reference count for data corresponding to a task. The reference count might correspond to a number of tasks, for example duplicate multicast tasks, that refer to the data. The reference count might incremented each time a task is duplicated corresponding to a multicast flow. However, in some embodiments, the reference count might not be incremented for each duplication of the task, but rather is incremented by n−1 for every n copies of the task. For example, in an exemplary embodiment, the reference count is incremented by 255 for the first duplication of the task, and is decremented by 256—number of copies for the last copy of the task. If there are more than 256 copies, then another increment is made for every 256th multicast copy.

Thus, as described herein, embodiments of the present invention provide a method of processing packets of a network processor having a plurality of processing modules and a shared memory with packet data. The network processor generates one or more tasks corresponding to each of a plurality of received packets associated with one or more data flows. A traffic manager of the network processor receives a task corresponding to a data flow, the task provided by a processing module of the network processor. The traffic manager determines whether the received task corresponds to a unicast data flow or a multicast data flow, wherein a unicast data flow is transmitted to a single network location in communication with the network processor, and a multicast data flow is transmitted to one or more network locations in communication with the network processor. If the received task corresponds to a multicast data flow, an address in the shared memory of launch data tables is determined based on one or more identifiers corresponding to the task. The launch data corresponding to the task is read from the determined address. Two or more output tasks corresponding to the multicast data flow are generated based on the one or more identifiers and the read launch data. If at least one scheduling queue of the traffic manager corresponding to the multicast data flow is available to receive the two or more output tasks, the one or more output tasks are added at the tail end of the at least one scheduling queue.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation." As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

While the exemplary embodiments of the present invention have been described with respect to processing blocks in a software program, including possible implementation as a digital signal processor, micro-controller, or general purpose computer, the present invention is not so limited. As would be apparent to one skilled in the art, various functions of software might also be implemented as processes of circuits. Such circuits might be employed in, for example, a single integrated circuit, a multi-chip module, a single card, or a multi-card circuit pack.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. The present invention can also be embodied in the form of program code, for example, whether stored in a non-transitory machine-readable storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments of the present invention.

It will be further understood that various changes in the details, materials, and arrangements of the parts which have been described and illustrated in order to explain the nature of this invention might be made by those skilled in the art without departing from the scope of the invention as expressed in the following claims.

We claim:

1. A method of processing packets of a network processor having a plurality of processing modules and at least one shared memory with packet data, the method comprising:
generating, by the network processor, one or more tasks corresponding to each of a plurality of received packets associated with one or more data flows;
receiving, by a traffic manager of the network processor, a task corresponding to a data flow, the task provided by one of the plurality of processing modules of the network processor;
determining, by the traffic manager, whether the received task corresponds to a unicast data flow or a multicast data flow, wherein a unicast data flow is transmitted to a single network location in communication with the network processor, and wherein a multicast data flow is transmitted to one or more network locations in communication with the network processor;
if the received task corresponds to a multicast data flow:
determining, based on one or more identifiers corresponding to the task, an address of launch data stored in one or more launch data tables in the at least one shared memory,
wherein the step of determining the address of the launch data includes providing, by the address of the launch data, one or more expanded unicast entries corresponding to the multicast task, wherein each expanded unicast entry corresponds to a given destination for the multicast task, wherein each expanded unicast entry corresponds to an address in a unicast launch table and the address in the unicast launch table corresponds to the address of the launch data in the at least one shared memory;
reading the launch data corresponding to the task from the determined address of the at least one shared memory;
generating, based on the one or more identifiers and the read launch data, two or more output tasks corresponding to the multicast data flow;
determining if at least one scheduling queue of the traffic manager corresponding to the multicast data flow is available to receive the two or more output tasks;
and, if available, adding the one or more output tasks at the tail end of the at least one scheduling queue.

2. The method of claim 1, further comprising:
if the received task corresponds to a unicast data flow:
determining a flow identifier corresponding to the task;
generating, based on the flow identifier, an output task corresponding to the unicast data flow;
determining if a scheduling queue of the traffic manager corresponding to the flow identifier is available to receive the output task;
and, if available, adding the output task at the tail end of the scheduling queue.

3. The method of claim 1, wherein the step of determining one or more identifiers corresponding to the task comprises:
determining a virtual pipeline ID, a multicast ID, and one or more task parameters corresponding to the received task, wherein the virtual pipeline ID corresponds to a given order in which a task is passed between the plurality of processing modules of the network processor and wherein the multicast ID corresponds to a multicast data flow of the traffic manager.

4. The method of claim 3, wherein the step of determining, based on the one or more identifiers, an address of launch data stored in one or more launch data tables in the at least on shared memory comprises:
reading, from the multicast data flow table, a base address and length of launch data stored in the at least one shared memory, the base address and length corresponding to the determined virtual pipeline ID;
generating, by an address generator, an address of launch data corresponding to one or more data flows of the multicast data flow, the address based on the multicast ID, the base address and length.

5. The method of claim 4, wherein the address is generated by the steps of:
left shifting the multicast ID by 8 bits;
an adding the shifted multicast ID to the base address.

6. The method of claim 1, further comprising:
incrementing a reference count of one or more packet data units stored in the at least one shared memory, the packet data units corresponding to the two or more output tasks corresponding to the multicast data flow, thereby generating two or more output task copies for the received multicast task without duplicating the packet data units stored in the at least one shared memory;
and decrementing the reference count of the one or more packet data units when processing of an output task corresponding to the packet data unit is completed by the traffic manager.

7. The method of claim 6, wherein:
the reference count is incremented by 256 for every 256th output task corresponding to each packet data unit;
the reference count is decremented by 256 less the number of output tasks, each time an output task corresponding to the packet data unit is completed.

8. The method of claim 1, further comprising:
determining, based on the read launch data, a number of output tasks to be generated corresponding to the multicast data flow.

9. The method of claim 1, further comprising:
determining, based on the read launch data, which ones of a plurality of scheduling queues correspond to one or more of the generated output tasks.

10. The method of claim 1, wherein the step of reading launch data corresponding to the task from the determined address of the at least one shared memory comprises:
reading the launch data from at least one launch data table of the network processor, the launch data tables comprising (i) a link to a next launch data table in a linked list of launch data tables corresponding to tile multicast data flow, and (ii) one or more launch data entries, each launch data entry comprising: an output task template ID, a unicast flow ID, and a valid indicator.

11. The method of claim 10, wherein:
the output task template ID corresponds to a structure of an output task generated based on the launch data entry;
the valid indicator indicates whether the launch data entry is valid;
and the unicast flow ID corresponds to a unicast data flow corresponding to the launch data entry, thereby translating a multicast task into a series of two or more unicast data flows of the network processor, wherein each unicast data flow corresponds to one network location of the multicast data flow.

12. The method of claim 11, further comprising:
allocating, by the traffic manager, one or more launch data tables to the linked list of launch data corresponding to the multicast data flow, based on a number of unicast data flows associated with the multicast data flow;
and updating the link in each launch data table of the linked list to correspond to the allocated one or more launch data tables.

13. A non-transitory machine-readable medium, having encoded thereon program code, wherein, when the program code is executed by a machine, the machine implements a method of processing packets of a network processor having a plurality of processing modules and at least one shared memory with packet data, the method comprising:
generating, by the network processor, one or more tasks corresponding to each of a plurality of received packets associated with one or more data flows;
receiving, by a traffic manager of the network processor, a task corresponding to a data flow, the task provided by one of the plurality of processing modules of the network processor;
determining, by the traffic manager, whether the received task corresponds to a unicast data flow or a multicast data flow, wherein a unicast data flow is transmitted to a single network location in communication with the network processor, and wherein a multicast data flow is transmitted to one or more network locations in communication with the network processor;

if the received task corresponds to a multicast data flow:

determining, based on one or more identifiers corresponding to the task, an address of launch data stored in one or more launch data tables in the at least one shared memory, wherein the step of determining the address of the launch data includes providing, by the address of the launch data, one or more expanded unicast entries corresponding to the multicast task, wherein each expanded unicast entry corresponds to a given destination for the multicast task, wherein each expanded unicast entry corresponds to an address in a unicast launch table and the address in the unicast launch table corresponds to the address of the launch data in the at least one shared memory;

reading the launch data corresponding to the task from the determined address of the at least one shared memory;

generating, based on the one or more identifiers and the read launch data, two or more output tasks corresponding to the multicast data flow;

determining if at least one scheduling queue of the traffic manager corresponding to the multicast data flow is available to receive the two or more output tasks;

and, if available, adding the one or more output tasks at the tail end of the at least one scheduling queue.

14. The non-transitory machine-readable medium of claim 13, wherein the step of determining one or more identifiers corresponding to the task comprises:

determining a virtual pipeline ID, a multicast ID, and one or more task parameters corresponding to the received task, wherein the virtual pipeline ID corresponds to a given order in which a task is passed between the plurality of processing modules of the network processor and wherein the multicast ID corresponds to a multicast data flow of the traffic manager.

15. The non-transitory machine-readable medium of claim 14, wherein the step of determining, based on the one or more identifiers, an address of launch data stored in one or more launch data tables in the at least on shared memory comprises:

reading, from the multicast data flow table, a base address and length of launch data stored in the at least one shared memory, the base address and length corresponding to the determined virtual pipeline ID;

generating, by an address generator, an address of launch data corresponding to one or more data flows of the multicast data flow, the address based on the multicast ID, the base address and length.

16. The non-transitory machine-readable medium of claim 13, further comprising: incrementing a reference count of one or more packet data units stored in the at least one shared memory, the packet data units corresponding to the two or more output tasks corresponding to the multicast data flow, thereby generating two or more output task copies for the received multicast task without duplicating the packet data units stored in the at least one shared memory;

and decrementing the reference count of the one or more packet data units when processing of an output task corresponding to the packet data unit is completed by the traffic manager.

17. A network processor comprising: a plurality of processing modules and at least one shared memory with packet data, wherein one of the plurality of processing modules is configured to generate one or more tasks corresponding to each of a plurality of received packets associated with one or more data flows;

a traffic manager of the network processor configured to:

receive a task corresponding to a data flow, the task provided by one of the plurality of processing modules of the network processor;

determine whether the received task corresponds to a unicast data flow or a multicast data flow, wherein a unicast data flow is transmitted to a single network location in communication with the network processor, and wherein a multicast data flow is transmitted to one or more network locations in communication with the network processor;

if the received task corresponds to a multicast data flow:

determine, based on one or more identifiers corresponding to the task, an address of launch data stored in one or more launch data tables in the at least one shared memory, wherein the step of determining the address of the launch data includes providing, by the address of the launch data, one or more expanded unicast entries corresponding to the multicast task, wherein each expanded unicast entry corresponds to a given destination for the multicast task, wherein each expanded unicast entry corresponds to an address in a unicast launch table and the address in the unicast launch table corresponds to the address of the launch data in the at least one shared memory;

reading the launch data corresponding to the task from the determined address of the at least one shared memory;

generate, based on the one or more identifiers and the read launch data, two or more output tasks corresponding to the multicast data flow;

determine if at least one scheduling queue of the traffic manager corresponding to the multicast data flow is available to receive the two or more output tasks;

and, if available, adding the one or more output tasks at the tail end of the at least one scheduling queue.

18. The network processor of claim 17, wherein the traffic manager is further configured to:

increment a reference count of one or more packet data units stored in the at least one shared memory, the packet data units corresponding to the two or more output tasks corresponding to the multicast data flow, thereby generating two or more output task copies for the received multicast task without duplicating the packet data units stored in the at least one shared memory;

and decrement the reference count of the one or more packet data units when processing of an output task corresponding to the packet data unit is completed by the traffic manager.

19. The network processor of claim 18, wherein the one or more one or more processing modules comprise at least one of: control processors comprising Reduced Instruction Set Computing (RISC) central processing units (CPUs) and hardware accelerators and wherein the at least one shared memory comprises at least one of an embedded DRAM and a double data rate (DDR) DRAM coupled to the network processor.

20. The network processor of claim 18, wherein the network processor is implemented as an integrated circuit chip.

* * * * *